(12) United States Patent
Sun et al.

(10) Patent No.: US 12,347,894 B2
(45) Date of Patent: Jul. 1, 2025

(54) TANK, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Jingxuan Sun, Ningde (CN); Jianfu He, Ningde (CN); Yonghuang Ye, Ningde (CN); Qian Liu, Ningde (CN); Xueyang Sun, Ningde (CN); Xiaofu Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 197 days.

(21) Appl. No.: 17/903,677

(22) Filed: Sep. 6, 2022

(65) Prior Publication Data
US 2023/0068186 A1   Mar. 2, 2023

Related U.S. Application Data

(63) Continuation of application No. PCT/CN2021/114640, filed on Aug. 26, 2021.

(51) Int. Cl.
*H01M 50/682* (2021.01)
*H01M 50/143* (2021.01)
(Continued)

(52) U.S. Cl.
CPC ....... *H01M 50/682* (2021.01); *H01M 50/143* (2021.01); *H01M 50/317* (2021.01);
(Continued)

(58) Field of Classification Search
CPC .................................................. H01M 50/682
See application file for complete search history.

(56) References Cited

U.S. PATENT DOCUMENTS

| 3,653,972 | A | 4/1972 | Bolles |
| 8,951,654 | B2 * | 2/2015 | Sachdev .............. H01M 10/60 |
| | | | 429/129 |

(Continued)

FOREIGN PATENT DOCUMENTS

| CN | 101213703 A | 7/2008 |
| CN | 103237596 A | 8/2013 |

(Continued)

OTHER PUBLICATIONS

The European Patent Office (EPO) Extended Search Report for EP Application No. 21927059.2. Jun. 19, 2024 9 Pages.

(Continued)

*Primary Examiner* — Amanda J Barrow
(74) *Attorney, Agent, or Firm* — ANOVA LAW GROUP, PLLC

(57) ABSTRACT

A capsule includes two membranes arranged in the capsule and configured to partition an interior of the capsule into a plurality of independent accommodation cavities, and a plurality of fragile structures comprising a first fragile structure, a second fragile structure, and a third fragile structure. A packaging strength of the first fragile structure is greater than a packaging strength of the second fragile structure. The packaging strength of the second fragile structure is greater than a packaging strength of the third fragile structure.

13 Claims, 8 Drawing Sheets

(51) Int. Cl.
  *H01M 50/317* (2021.01)
  *H01M 50/383* (2021.01)
  *H01M 50/618* (2021.01)

(52) U.S. Cl.
  CPC ....... *H01M 50/383* (2021.01); *H01M 50/618* (2021.01); *H01M 2220/20* (2013.01)

(56) References Cited

U.S. PATENT DOCUMENTS

| | | | |
|---|---|---|---|
| 2007/0015048 A1* | 1/2007 | Lee | H01M 10/0525 429/118 |
| 2009/0155354 A1* | 6/2009 | McLean | A61K 9/4866 424/452 |
| 2013/0004807 A1 | 1/2013 | Li et al. | |
| 2013/0171483 A1* | 7/2013 | Shibata | H01M 10/52 429/56 |
| 2013/0296508 A1* | 11/2013 | Gueller | B01J 19/2445 526/78 |
| 2015/0093635 A1* | 4/2015 | Grimminger | H01M 10/0567 429/188 |
| 2015/0207125 A1* | 7/2015 | Kishimoto | H01M 50/538 429/129 |
| 2016/0054218 A1 | 2/2016 | Mishra et al. | |
| 2017/0331090 A1* | 11/2017 | Li | H01M 50/143 |
| 2023/0046770 A1* | 2/2023 | Xu | H01M 50/204 |
| 2023/0065566 A1* | 3/2023 | Sun | H01M 50/103 |

FOREIGN PATENT DOCUMENTS

| | | | | | |
|---|---|---|---|---|---|
| CN | 103500806 A | | 1/2014 | | |
| CN | 203800134 U | | 8/2014 | | |
| CN | 105742733 A | | 7/2016 | | |
| CN | 106654355 | * | 5/2017 | ........ | H01M 10/0525 |
| CN | 106654355 A | | 5/2017 | | |
| CN | 108666465 A | | 10/2018 | | |
| CN | 109461938 A | | 3/2019 | | |
| CN | 110048154 A | | 7/2019 | | |
| CN | 110265621 A | | 9/2019 | | |
| CN | 209785980 A | | 12/2019 | | |
| CN | 211265542 U | | 8/2020 | | |
| CN | 112029343 A | | 12/2020 | | |
| CN | 213845424 U | | 7/2021 | | |
| JP | H06014975 B2 | | 3/1994 | | |
| JP | H09267093 A | | 10/1997 | | |
| JP | H11501948 A | | 2/1999 | | |
| JP | 2003327270 A | | 11/2003 | | |
| JP | 2004043531 A | | 2/2004 | | |
| JP | 2009004362 A | | 1/2009 | | |
| JP | 2010073595 A | | 4/2010 | | |
| JP | 2011068664 A | | 4/2011 | | |
| JP | 2012129009 A | | 7/2012 | | |
| JP | 2013197013 A | | 9/2013 | | |
| JP | 2014523622 A | | 9/2014 | | |
| JP | 2018016318 A | | 2/2018 | | |
| JP | 2019087371 A | | 6/2019 | | |
| JP | 2019160774 A | | 9/2019 | | |
| JP | 2021132011 A | | 9/2021 | | |
| JP | 2022546496 A | | 11/2022 | | |
| JP | 2023539705 A | | 9/2023 | | |
| KR | 20110106527 A | | 9/2011 | | |
| KR | 10-2017-0103192 | * | 9/2017 | ......... | H01M 50/342 |
| WO | 9933137 A1 | | 7/1999 | | |
| WO | WO 2013/069622 | * | 5/2013 | ......... | H01M 10/052 |
| WO | 2017191759 A1 | | 11/2017 | | |
| WO | WO 2023/070546 | * | 5/2023 | ......... | H01M 50/609 |
| WO | WO 2023/070550 | * | 5/2023 | ............ | H01M 50/60 |

OTHER PUBLICATIONS

The World Intellectual Property Organization (WIPO) International Search Report and Written Opinion for PCT/CN2021/114640 Apr. 28, 2022 13 Pages (including translation).
The Japan Patent Office (JPO) Notification of Reasons for Refusal for Application No. 2022-550751 Oct. 24, 2023 10 Pages(including translation).
Japan Patent Office (JPO) Decision to Grant a Patent For JP Application No. 2022-550751 Feb. 27, 2024 6 Pages (Translation Included).
The World Intellectual Property Organization (WIPO) International Search Report and Written Opinion for PCT/CN2021/127529 May 30, 2022 15 Pages (including translation).
The World Intellectual Property Organization (WIPO) International Search Report and Written Opinion for PCT/CN2021/127546 Jul. 29, 2022 12 Pages (including translation).
United States Patent and Trademark Office (USPTO) Requirement for Restriction/Election and Index of Claims for U.S. Appl. No. 17/965,281, filed Aug. 7, 2024 7 Pages.
Korean Intellectual Property Office (KIPO) Request for the Submission of an Opinion for Application No. 10-2023-7000452 Oct. 16, 2024 18 Pages (including translation).
The Korean Intellectual Property Office Request for the Submission of an Opinion for Application No. 10-2023-7000452 Apr. 24, 2025 20 Pages (including translation).
The World Intellectual Property Organization (WIPO) International Search Report for PCT/CN2021/127529 May 30, 2022 7 Pages (including translation).

* cited by examiner

TANK, BATTERY CELL, BATTERY, AND ELECTRICAL DEVICE

CROSS-REFERENCE TO RELATED APPLICATION

This application is a continuation of International Application No. PCT/CN2021/114640, filed on Aug. 26, 2021, the entire content of which is incorporated herein by reference.

TECHNICAL FIELD

This application relates to the field of batteries, and in particular, to a capsule, a battery cell, a battery, and an electrical device.

BACKGROUND

Energy conservation and emission reduction is key to sustainable development of the automobile industry. Electric vehicles have become an important part of the sustainable development of the automobile industry by virtue of energy saving and environmental friendliness. Battery technology is crucial to development of electric vehicles.

During research, the inventor of this application finds that, with the aging of a cell core and the increase of charge-and-discharge cycles, problems such as electrolyte shortage may occur in an existing battery during the cycles.

SUMMARY

Embodiments of this application provide a capsule, a battery cell, a battery, and an electrical device to enhance battery safety.

According to a first aspect, an embodiment of this application discloses a capsule. A plurality of independent accommodation cavities are arranged in the capsule. Each of the accommodation cavities includes a corresponding fragile structure. Each fragile structure possesses a different packaging strength.

This embodiment of this application implements the function of storing different types of filling substances by using a single capsule. The different filling substances stored in the accommodation cavities in the capsule can be released stepwise in response to different external pressures. Therefore, the cell core at different stages can be refilled with different dosages of electrolyte or different types of desired substances depending on the internal pressure of the battery cell, thereby improving pertinency of refilling the cell core with desired substances.

In some embodiments, one or more sub-capsules are arranged inside the capsule. The capsule and the sub-capsules are nested with each other to form independent accommodation cavities. Packaging strengths of the corresponding fragile structures of the accommodation cavities increase progressively from outward to inward.

The multi-layer nested parent-child capsule disclosed in this embodiment of this application is simple in structure and implements the function of storing different types of filling substances by using a single capsule. The different filling substances stored in the accommodation cavities in the capsule can be released stepwise in response to different external pressures.

In some embodiments, a membrane is arranged in the capsule. The membrane is configured to partition an interior of the capsule into a plurality of independent accommodation cavities. The fragile structure is arranged at a position located on a surface of the capsule and corresponding to each accommodation cavity. Each fragile structure possesses a different packaging strength.

The twin capsule structure disclosed in this embodiment of this application is simple in structure and implements the function of storing different types of filling substances by using a single capsule. The different filling substances stored in the accommodation cavities in the capsule can be released stepwise.

According to a second aspect, an embodiment of this application discloses a battery cell, including: a housing; a cell core, accommodated in the housing; and the capsule disclosed in the foregoing embodiment, where the capsule is accommodated in the housing, and is arranged corresponding to a sidewall of the cell core.

This embodiment of this application implements the function of storing different types of filling substances by using a single capsule. The different filling substances stored in the accommodation cavities in the capsule can be released stepwise in response to different external pressures, thereby improving pertinency of refilling the cell core with the desired substances. Moreover, with the twin capsule and the parent-child capsule arranged compositely inside the battery cell, the cell core can be refilled with substances precisely and meticulously.

In some embodiments, the fragile structure is arranged corresponding to the sidewall of the cell core.

In this embodiment of this application, the filling substance can contact the sidewall of the cell core first, thereby improving the effect of infiltration.

In some embodiments, a plurality of cell cores are included. The capsule is arranged between each cell core and a sidewall of the housing, and/or the capsule is arranged between adjacent cell cores.

To improve the effect of infiltration, this embodiment of this application arranges a capsule structure between different cell cores. When the gas pressure in the battery cell is excessive, or the cell core expands during use, in a case that the expansion force is greater than a pressure threshold tolerable by the fragile structure of the capsule, the capsule arranged between the cell cores is ruptured, and the overflowing substance directly contacts the cell core, so that the cell core can absorb the desired substance more efficiently.

In some embodiments, the capsule includes a plurality of fragile structures. The plurality of fragile structures are arranged corresponding to sidewalls of the cell core respectively.

In this embodiment of this application, by arranging a plurality of fragile structures corresponding to the sidewalls of the cell core respectively, the capsule can release the filling substance from the plurality of fragile structures simultaneously. A plurality of parts of the cell core can contact the filling substance simultaneously, thereby improving the effect of infiltration for the cell core, and making the cell core absorb the desired filling substance more efficiently.

In some embodiments, an explosion-proof valve is arranged on the housing, and the capsule is arranged opposite to the explosion-proof valve.

In this embodiment of this application, by arranging the capsule opposite to the explosion-proof valve, the filling substance stored in the capsule can be released more efficiently.

In some embodiments, each fragile structure possesses a different packaging thickness.

In this embodiment of this application, the corresponding fragile structure of each accommodation cavity possesses a different packaging strength. In this way, among the corresponding fragile structures of the accommodation cavities under the action of the gas pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually.

In some embodiments, packaging strengths of the fragile structures change stepwise.

In this embodiment of this application, in view of the characteristics of the internal pressure of the cell core and the substances required by the cell core in different pressure stages, the packaging strengths of the corresponding fragile structures of the accommodation cavities are set to change stepwise to gradually release the substances required by the cell core.

In some embodiments, each accommodation cavity stores a different substance.

In this embodiment of this application, different substances are stored in different accommodation cavities and available for refilling the cell core, thereby achieving the purposes such as improving the lifespan of the cell core and the safety of the cell core.

In some embodiments, the accommodation cavities store a flame retardant, a gas absorbent, a lithium supplementing agent, and an electrolytic solution respectively in descending order of the packaging strength of the fragile structure.

In this embodiment of this application, the cell core is provided with various desired substances more pertinently, thereby achieving the purposes such as improving the lifespan of the cell core and the safety of the cell core.

According to a third aspect, an embodiment of this application discloses a battery cell, including: a housing; a cell core, accommodated in the housing; and a plurality of capsules, accommodated in the housing, and arranged corresponding to sidewalls of the cell core respectively, where a fragile structure is arranged on a surface of each of the capsules, and the fragile structure of each capsule possesses a different packaging strength.

In this embodiment of this application, a plurality of discrete capsules with fragile structures of different packaging strengths are arranged in the battery cell, so that different discrete capsules can release different filling substances stepwise in sequence under different pressures.

In some embodiments, the fragile structure is arranged corresponding to the sidewall of the cell core.

In this embodiment of this application, the filling substance can contact the sidewall of the cell core first, thereby improving the effect of infiltration.

In some embodiments, a plurality of cell cores are included.

The capsule is arranged between each cell core and a sidewall of the housing, and/or the capsule is arranged between adjacent cell cores.

To improve the effect of infiltration, this embodiment of this application arranges a capsule structure between different cell cores. When the gas pressure in the battery cell is excessive, or the cell core expands during use, in a case that the expansion force is greater than a pressure threshold tolerable by the fragile structure of the capsule, the capsule arranged between the cell cores is ruptured, and the overflowing substance directly contacts the cell core, so that the cell core can absorb the desired substance more efficiently.

In some embodiments, the capsule includes a plurality of fragile structures. The plurality of fragile structures are arranged corresponding to sidewalls of the cell core respectively.

In this embodiment of this application, by arranging a plurality of fragile structures corresponding to the sidewalls of the cell core respectively, the capsule can release the filling substance from the plurality of fragile structures simultaneously. A plurality of parts of the cell core can contact the filling substance simultaneously, thereby improving the effect of infiltration for the cell core, and making the cell core absorb the desired filling substance more efficiently.

In some embodiments, the fragile structure of each capsule possesses a different packaging thickness.

In this embodiment of this application, the corresponding fragile structure of each accommodation cavity possesses a different packaging strength. In this way, among the corresponding fragile structures of the accommodation cavities under the action of the gas pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually.

In some embodiments, packaging strengths of the fragile structures of the capsules change stepwise.

In this embodiment of this application, in view of the characteristics of the internal pressure of the cell core and the substances required by the cell core in different pressure stages, the packaging strengths of the corresponding fragile structures of the accommodation cavities are set to change stepwise to gradually release the substances required by the cell core.

According to a fourth aspect, an embodiment of this application discloses a battery, including the battery cell according to the foregoing embodiment.

According to a fifth aspect, an embodiment of this application discloses an electrical device. The electrical device includes the battery disclosed in the foregoing embodiment, and the battery is configured to provide electrical energy.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

Figure 1:
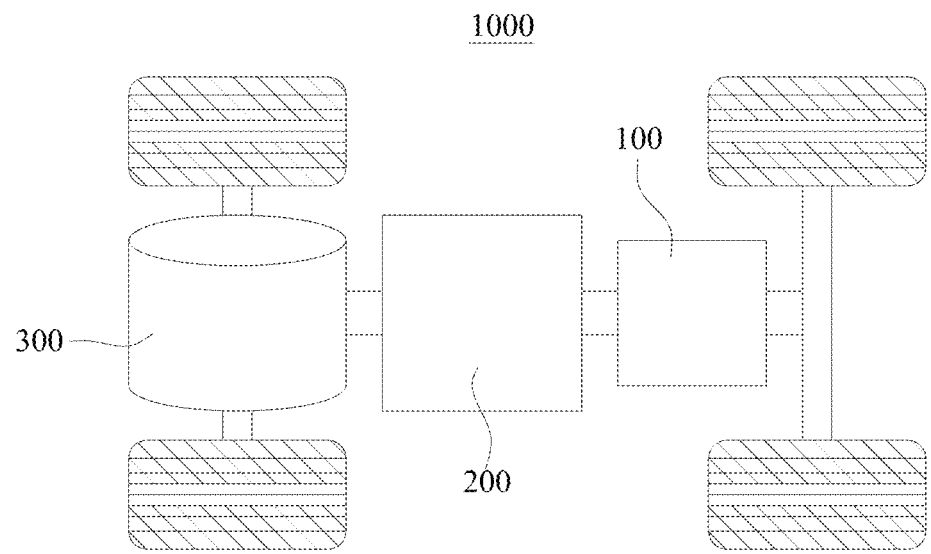
FIG. 1 is a schematic structural diagram of a vehicle according to an embodiment of this application.

REFERENCE NUMERALS vehicle 1000, battery 100, box 10, upper box 11, lower box 12, controller 200, motor 300;

battery cell 20, housing 210, electrode 220, explosion-proof valve 230, cell core 240;

discrete capsule 40, accommodation cavity 410, capsule wall 411, fragile structure 412;

first discrete capsule 401, first capsule wall 411, first fragile structure 414; second discrete capsule 402, second capsule wall 421, second fragile structure 422; third discrete capsule 403, fourth discrete capsule 404;

parent-child capsule 50, first parent-child capsule 501, second parent-child capsule 502, third parent-child capsule 503, fourth parent-child capsule 504, first accommodation cavity 510, first capsule wall 511, first fragile structure (512, 515), first filling substance 513, second accommodation cavity 520, second capsule wall 521, second fragile structure (522, 525), second filling substance 523, third accommodation cavity 530, third capsule wall 531, third fragile structure (532, 535), third filling substance 533;

twin capsule 60, first twin capsule 601, second twin capsule 602, third twin capsule 603, fourth twin capsule 604, first accommodation cavity 610, first capsule wall 611, first fragile structure (612, 615), first filling substance 613, first membrane 614, second accommodation cavity 620, second capsule wall 621, second fragile structure (622, 625), second filling substance 623, second membrane 624, third accommodation cavity 630, third capsule wall 631, third fragile structure (632, 635), third filling substance 633.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly, "a plurality of groups" means two or more groups (including two groups), and "a plurality of pieces" means two or more pieces (including two pieces).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in a cylindrical shape, a flat shape, a cuboidal shape, or other shapes, without being limited in embodiments of this application. Depending on the form of packaging, the battery cell is typically classed into three types: cylindrical battery cell, prismatic battery cell, and pouch-type battery cell, without being limited in embodiments of this application.

Currently, with the progress of technology, power batteries are applied more widely. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps expanding with the widening of the fields to which the power batteries are applicable.

The inventor of this application has noticed that ions are intercalated into or deintercalated from a positive active material and a negative active material during charge-and-discharge cycles of a battery, resulting in expansion inside a cell core. An electrolytic solution inside the cell core decreases gradually, resulting in electrolyte shortage inside the cell core and lack of active lithium components. With the aging of the cell core and excessive amount of gassing inside the cell core, the problem of metal dissolution gradually occurs. In severer cases, thermal runaway may occur, and the battery is prone to fire or explosion. The resulting safety problems are nonnegligible.

In view of this, an electrolyte refilling mechanism is usually arranged in a battery cell. The electrolyte refilling mechanism contains an electrolytic solution. When expansion occurs inside the cell core and an internal pressure increases, the electrolyte refilling mechanism ruptures, and releases and provides pre-stored electrolytic solution to the cell core, so as to make up for the electrolytic solution that is lacking due to the increased charge-and-discharge cycles or aging of the cell core.

However, during research, the inventor of this application finds that the amount of the electrolytic solution that is lacking varies depending on how long the cell core has been used. For example, after the cell core has just been used for a short duration, just a small amount of electrolytic solution is lacking. With the increase of the duration of being used, the amount of electrolytic solution that is lacking increases gradually. Therefore, the cell core at different stages needs to be refilled with different dosages of electrolytic solution. In addition, the electrolyte shortage inside the cell core leads to different hazards in different stages of the cell core. Electrolyte refilling alone is unable to solve the problems arising in the long-term use of the cell core. Currently, no solutions are available to pertinently refilling the battery cell with the substance that is lacking, and to resolving hazards at different stages. Refined solutions are lacking.

In view of the foregoing factors, in order to solve the problems of shortage of substances inside the cell core caused by excessive charge-and-discharge cycles and aging of the cell core in use, the inventor of this application has carried out in-depth research and designed a novel capsule, battery cell, and electrical device. A plurality of independent accommodation cavities are arranged inside the capsule, and each accommodation cavity includes fragile structures that differ in packaging strength. Therefore, the same substance or different substances in the cell core can be released gradually in view of a pressure inside the cell core that is in use or in different aging states. For the cell core at different stages, different dosages of electrolytic solution or different types of desired substances are provided, thereby improving pertinency of substance refilling for the cell core, and solving a series of problems arising at different use stages of the cell core, for example, electrolyte shortage, lack of active lithium, a large amount of gas generated, dissolution of transition metal, and thermal runaway.

The capsule and the battery cell disclosed in embodiments of this application are applicable to, but without being limited to, electrical devices such as a vehicle, watercraft, or aircraft. A power supply system of the electrical device may include the capsule, the battery cell, and the like disclosed in this application to help alleviate the problems such as lack of substances and degradation of safety of the cell core in use, and improve performance stability and longevity of the battery.

An embodiment of this application provides an electrical device powered by a battery. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to an embodiment of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to start or navigate the vehicle 1000, or meet the operating power requirements of the vehicle in operation.

In some embodiments of this application, the battery 100 serves not only as an operating power supply of the vehicle 1000, but may also serve as a drive power supply of the vehicle 1000 to provide driving power for the vehicle 1000 in place of or partially in place of oil or natural gas.

Figure 2:
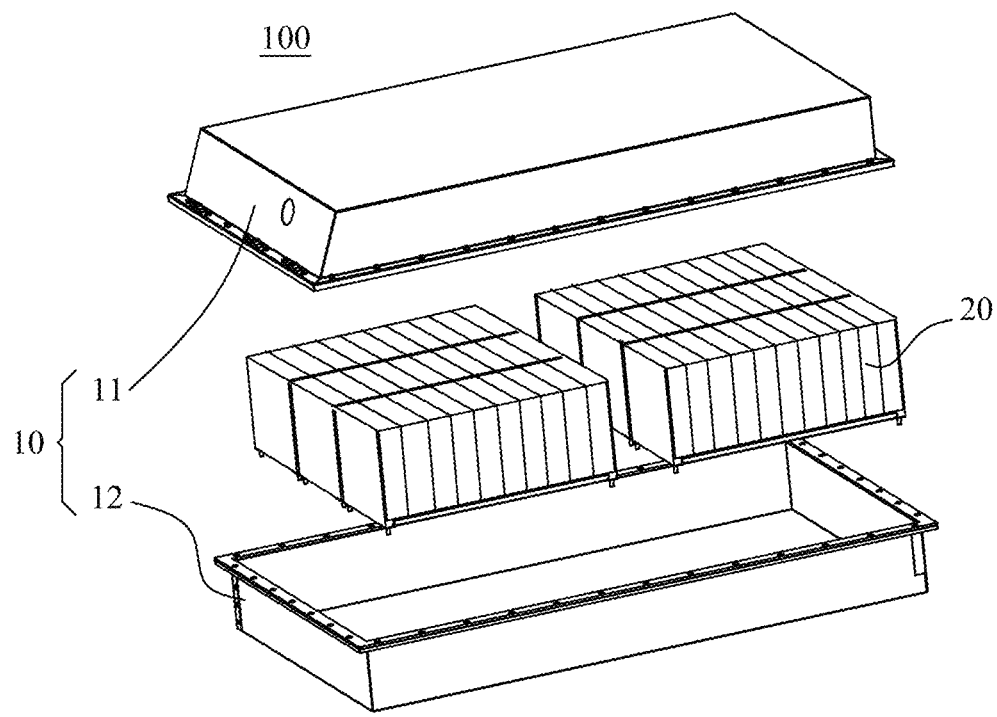
FIG. 2 is a schematic structural exploded view of a battery according to an embodiment of this application.

Referring to FIG. 2, FIG. 2 is an exploded view of a battery 100 according to an embodiment of this application. The battery 100 includes a box 10 and a battery cell 20. The battery cell 20 is accommodated in the box 10. The box 10 is configured to provide an accommodation space for the battery cell 20. The box 10 may be variously structured. In some embodiments, the box 10 may include an upper box 11 and a lower box 12. The upper box 11 and the lower box 12 fit and cover each other. The upper box 11 and the lower box 12 together define an accommodation space configured to accommodate the battery cell 20. The lower box 12 may be a hollow structure opened at one end. The upper box 11 may be a plate-like structure. The upper box 11 fits an opening end of the lower box 12 so that the upper box 11 and the lower box 12 together define the accommodation space. Alternatively, both the upper box 11 and the lower box 12 may be hollow structures opened at one end. The opening end of the upper box 11 fits the opening end of the lower box 12. Definitely, the box 10 formed by the upper box 11 and the lower box 12 may be in various shapes, such as a cylinder or a cuboid.

The battery 100 referred to in this embodiment of this application means a stand-alone physical module that includes one or more battery cells to provide a higher voltage and a higher capacity. For example, the battery 100 referred to in this application may include a battery module, a battery pack, and the like. There may be a plurality of battery cells 20, and the plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 100 in the form of battery modules first. A plurality of battery modules are then connected in series, parallel, or series-and-parallel pattern to form a whole for being accommodated in the box 10. The battery 100 may further include other structures. For example, the battery 100 may further include a busbar component. The busbar component is configured to implement electrical connection between the plurality of battery cells 20.

Each battery cell 20 may be, but is not limited to, a lithium-ion secondary battery, a lithium-ion primary battery, a lithium-sulfur battery, a sodium-lithium-ion battery, or a magnesium-ion battery. The battery cell 20 may be in a cylindrical shape, a flat shape, a cuboidal shape, or other shapes.

Figure 3:
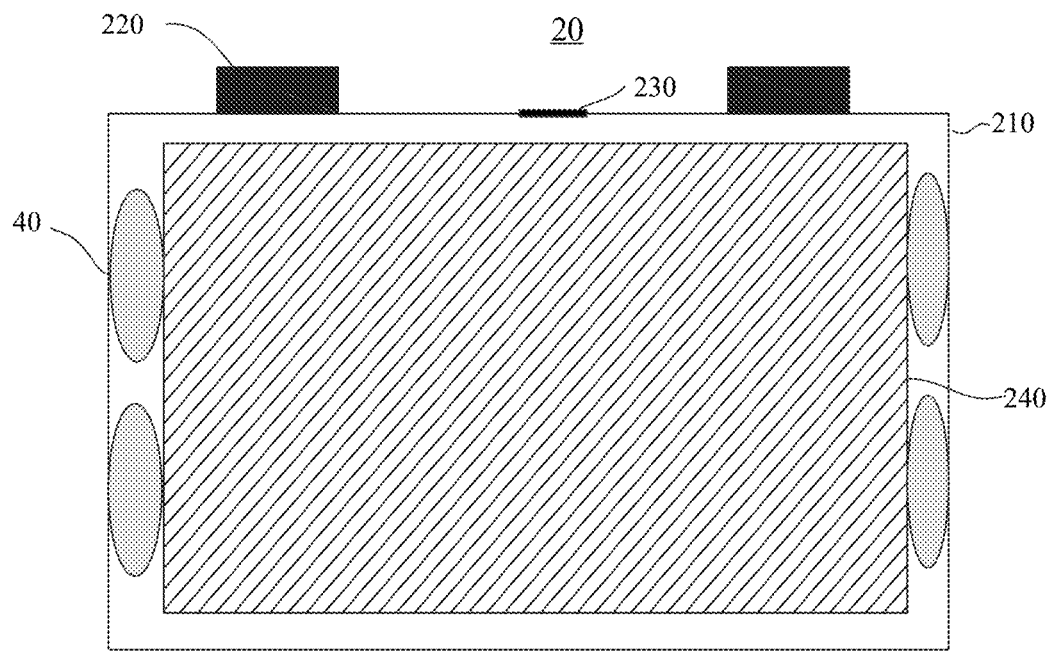
FIG. 3 is a schematic structural diagram of a battery cell according to an embodiment of this application.

For further understanding of the capsule and the battery cell according to embodiments of this application, refer to a battery cell 20 shown in FIG. 3. The battery cell 20 includes a housing 210, electrodes 220, and a cell core 240. The cell core 240 is located in the housing 210, and is connected to the electrodes 220 and configured to output electrical energy outward.

The housing 210 is a component configured to form an internal environment of the battery cell. The formed internal environment may be used to accommodate the cell core, an electrolytic solution, and other components. The electrodes 220 are led out of the housing 210. The electrodes include a positive electrode and a negative electrode. The positive electrode and the negative electrode are connected to a positive tab and a negative tab of the cell core respectively by an adapter. The housing may be shaped and sized variously, for example, cuboidal, cylindrical, or hexagonal prismatic. Specifically, the shape of the housing may be determined depending on the specific shape and size of a cell core. The housing may be made of a variety of materials such as copper, iron, aluminum, stainless steel, aluminum alloy, or plastic, without being particularly limited herein.

In addition, when the battery cell is in use, gas is generated inside the cell core over time. The gas pressure inside the housing increases gradually. To ensure safety of the battery cell, an explosion-proof valve 230 is arranged between electrodes on the housing. When the gas pressure in the battery cell reaches a given value, the pressure can be released through the explosion-proof valve to avoid safety problems such as explosion of the battery cell.

The cell core 240 is a component that reacts electrochemically in the battery cell 20. The housing may contain one or more cell cores. The cell core is primarily formed by winding or stacking a positive electrode plate and a negative electrode plate, and a separator is generally arranged between the positive electrode plate and the negative electrode plate. The parts, coated with an active material, of the positive electrode plate and the negative electrode plate, constitute a body portion of the cell core. The parts, coated with no active material, of the positive electrode plate and the negative electrode plate, constitutes a positive tab and a negative tab, respectively. The positive tab and the negative tab may be located at one end of the body portion together or at two ends of the body portion respectively. In a charge-and-discharge process of the battery, the positive active material and the negative active material react with an electrolytic solution. The tabs are connected to electrode terminals to form a current circuit. The positive tab is connected to the positive electrode on the housing by an adapter, and the negative tab is connected to the negative electrode on the housing by an adapter.

In order to refill the cell core with desired substances during the use of the battery cell, one or more capsules 40 are arranged between the cell core 240 and the housing 210. The capsules 40 contain rapidly consumed substances such as electrolytic solution of the cell core. When the gas pressure in the battery cell or an expansion force of the cell core reaches a given value, the pressure acts on the capsules to crush the capsules, thereby releasing the electrolytic solution out of the capsules to supplement the electrolytic solution of the cell core, thereby alleviating the problems such as performance deterioration caused by electrolyte shortage after long-term use of the battery.

To solve the foregoing problems in the related art, the capsule according to this embodiment of this application is applied to the foregoing battery cell. The capsule according to this application can release the same substance or different substances gradually in view of a pressure inside the cell core that is in use or in different aging states. For the cell core at different stages, different dosages of electrolytic solution or different types of desired substances are provided, thereby solving the problems such as lack of substances and deterioration of safety performance of the battery cell in use.

Specifically, the capsule according to this embodiment of this application is shown in FIG. 4 to FIG. 7. A plurality of independent accommodation cavities are arranged in the capsule according to this embodiment of this application. Each of the accommodation cavities includes a corresponding fragile structure. Each fragile structure possesses a different packaging strength.

In this embodiment of this application, the capsule is usually a capsule-shaped or otherwise shaped object made of a flexible material and capable of accommodating and storing liquid, inert gas, or other forms of substances. Understandably, the capsule is not necessarily capsule-shaped, but may be made in any shape that meets requirements of the application environment, for example, may be square, round, oval, or irregularly shaped. The flexible material may be formed by stamping an aluminum sheet and then sputtering an inert material onto the surface of the stamped aluminum sheet, where the inert material is a high-molecular polymer such as PP, PE, PET, or PVC. Alternatively, the capsule may be made of other materials of specified flexibility and hardness.

Figure 4:
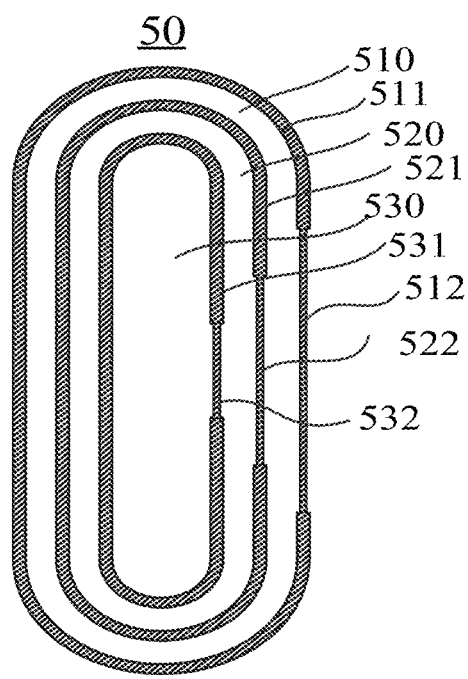
FIG. 4 is a schematic structural diagram of a parent-child capsule according to an embodiment of this application.
Figure 6:
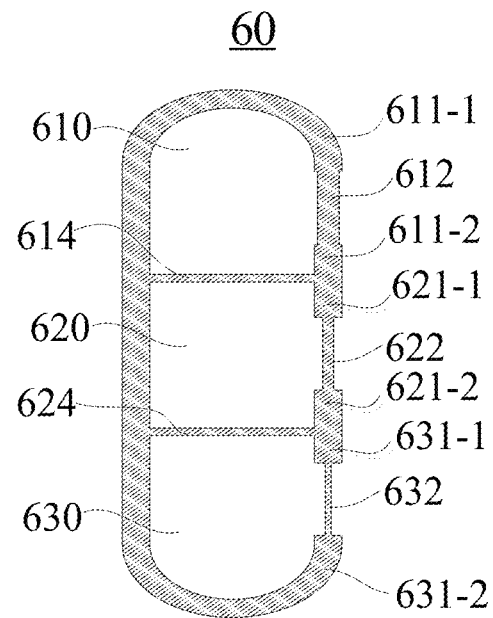
FIG. 6 is a schematic structural diagram of a twin capsule according to an embodiment of this application.

A plurality of independent accommodation cavities may be arranged in the capsule in the way shown in FIG. 4 or FIG. 6. Identical or different capsule materials may be used to partition the interior space of the capsule into a plurality of independent closed spaces. The closed spaces form independent accommodation cavities. The accommodation cavities are configured to hold liquid or inert gas. With the independent accommodation cavities arranged, different liquids or inert gases can be separated from each other, so as to release different substances pertinently.

Each accommodation cavity is formed by being surrounded by the flexible material. A fragile structure is arranged on an outer wall of each accommodation cavity enclosed with the corresponding flexible material. That is, each accommodation cavity formed in the capsule corresponds to a fragile structure separately. In this way, the liquid or inert gas stored in each accommodation cavity can be released through the corresponding fragile structure without affecting the filling substance stored in other accommodation cavities.

To release the filling substances from different accommodation cavities stepwise, this application assigns a different packaging strength to the fragile structure corresponding to each different accommodation cavity. In this way, among the corresponding fragile structures of the accommodation cavities under the action of the internal pressure of the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule is approximately 10% to 50%. The thickness of the fragile region is generally 10 µm to 300 µm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 µm, and the internal pressure threshold is 0.4 MPa when the thickness is 200 µm). Therefore, each capsule can regulate the pressure relief order by using stepwise thicknesses of the fragile regions. Alternatively, the fragile regions may be formed by nicking a given part of the outer wall of the capsule. The depth of the nick represents the packaging strength of the fragile region. A great depth represents a lower packaging strength, and a small depth represents a higher packaging strength.

In this embodiment of this application, a plurality of independent accommodation cavities are arranged inside the capsule, each accommodation cavity includes a corresponding fragile structure, and each fragile structure possesses a different packaging strength. In this way, this embodiment implements the function of storing different types of filling substances by using a single capsule. The different filling substances stored in the accommodation cavities in the capsule can be released stepwise in response to different external pressures. Therefore, the cell core at different stages can be refilled with different dosages of electrolytic solution or different types of desired substances depending on the internal pressure of the battery cell, thereby improving pertinency of refilling the cell core with the desired substances.

Figure 5:
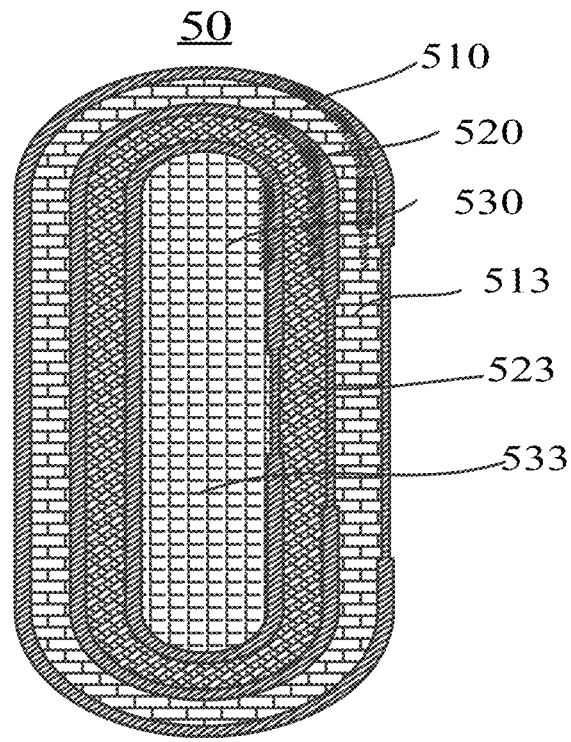
FIG. 5 is a schematic diagram of a parent-child capsule filled with different substances according to an embodiment of this application.

To describe the structure of the capsule in more detail, FIG. 4 shows a parent-child capsule structure. One or more sub-capsules are arranged inside the capsule. The capsule and the sub-capsules are nested with each other to form independent accommodation cavities. Packaging strengths of the corresponding fragile structures of the accommodation cavities increase progressively from outward to inward. FIG. 5 shows effects after the parent-child capsule structure is filled with different substances.

As shown in FIG. 4 and FIG. 5, the parent-child capsule structure 50 includes a first accommodation cavity 510, a second accommodation cavity 520, and a third accommodation cavity 530. The first accommodation cavity 510 is formed by being enclosed with a first capsule wall 511 and a first fragile structure 512. A sub-capsule is arranged inside the first accommodation cavity 510. The sub-capsule includes a second accommodation cavity 520. The second accommodation cavity 520 is formed by being enclosed with a second capsule wall 521 and a second fragile structure 522. A sub-capsule is further arranged inside the second accommodation cavity 520. The sub-capsule includes a third accommodation cavity 530. The third accommodation cavity 530 is formed by being enclosed with a third capsule wall 531 and a third fragile structure 532. As can be seen from FIG. 4, the outermost capsule forms a parent capsule of the parent-child capsule structure, and two sub-capsules are formed inside the parent capsule. In other words, the capsule and the sub-capsules are nested with each other to form independent accommodation cavities. Capsules are further nested inside a capsule to form hierarchical nesting.

During formation of the parent-child capsule, the innermost sub-capsule is formed first. After the third filling substance 533 is injected into the third accommodation cavity 530, the third accommodation cavity is sealed by laser welding or other means. At the same time, the third fragile structure 532 is formed on the third capsule wall 531. Subsequently, the sub-capsule is wrapped in a flexible material to form a parent capsule of the sub-capsule. The second accommodation cavity 520 is formed between the sub-capsule and the parent capsule. After the second filling substance 523 is injected into the second accommodation cavity 520, the second accommodation cavity is sealed by laser welding or other means. At the same time, the second fragile structure 522 is formed on the second capsule wall 521. Finally, the second sub-capsule is further wrapped in a flexible material to form a parent capsule of the second sub-capsule. The first accommodation cavity 510 is formed between the sub-capsule and the parent capsule. After the first filling substance 513 is injected into the first accommodation cavity 510, the first accommodation cavity is sealed by laser welding or other means. At the same time, the first fragile structure 512 is formed on the first capsule wall 511. It needs to be noted that FIG. 4 merely shows a structure in which three independent accommodation cavities are arranged inside the parent-child capsule. Fewer or more sub-capsules may be arranged as required, details of which are omitted here.

In the parent-child capsule structure, the packaging strengths of the fragile structures increase progressively in order from outside to inside of the parent-child capsule structure. The first fragile structure 512 is located on the surface of an outermost capsule, and possesses the lowest packaging strength, and ruptures first when receiving an internal pressure of the battery cell. The packaging strength of the second fragile structure 522 is higher than the packaging strength of the first fragile structure, and the packaging strength of the third fragile structure 532 is the highest. Under the action of the internal pressure of the battery cell, the fragile structures of the parent-child capsule are ruptured in sequence from outside to inside to release the first filling substance 513, the second filling substance 523, and the third filling substance 533 in sequence.

As can be seen from the foregoing embodiment, the parent-child capsule structure is nested hierarchically. A plurality of independent accommodation cavities are arranged, each accommodation cavity includes a corresponding fragile structure, and each fragile structure possesses a different packaging strength. In this way, this embodiment implements the function of storing different types of filling substances by using a single capsule. The different filling substances stored in the accommodation cavities in the capsule can be released stepwise in response to different external pressures, thereby improving pertinency of refilling the cell core with the desired substances.

Figure 7:
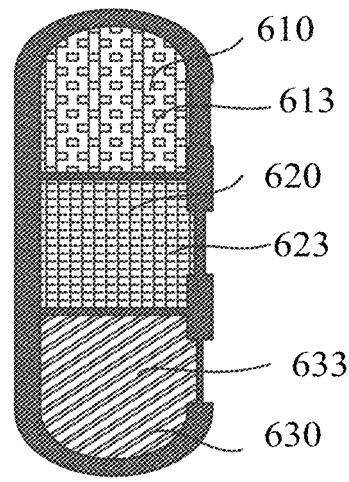
FIG. 7 is a schematic diagram of a twin capsule filled with different substances according to an embodiment of this application.

In another embodiment of this application, another twin capsule structure 60 is provided. As shown in FIG. 6, a membrane is arranged in the twin capsule. The membrane is configured to partition the interior of the capsule into a plurality of independent accommodation cavities. The fragile structure is arranged at a position located on a surface of the capsule and corresponding to each accommodation cavity. Each fragile structure possesses a different packaging strength. FIG. 7 is a schematic diagram of the twin capsule filled with different substances.

As shown in FIG. 6, a first accommodation cavity 610, a second accommodation cavity 620, and a third accommodation cavity 630 are arranged in the twin capsule 60. The first accommodation cavity 610 is isolated from the second accommodation cavity 620 by a first membrane 614. The second accommodation cavity 620 is isolated from the third accommodation cavity 630 by a second membrane 624, so that the accommodation cavities are independent of each other. The first accommodation cavity 610 is formed by being enclosed with a first part of a first capsule wall 611-1, a first fragile structure 612, a second part of the first capsule wall 611-2, and a first membrane 614. The first capsule wall 611, which includes the first part of the first capsule wall 611-1 and the second part of the first capsule wall 611-2, and the first fragile structure are located outside the twin capsule 60, and exposed outside. The first membrane 614 is located inside the twin capsule 60, and isolates the first accommodation cavity 610 from the second accommodation cavity 620 to make the two accommodation cavities independent of each other. The first membrane 614 may be made of the same material as the first capsule wall, or made of a different material. The first fragile structure 612 is arranged on a capsule wall corresponding to the first accommodation cavity 610. When the first fragile structure 612 is ruptured, the filling substance in the first accommodation cavity 610 is released.

The second accommodation cavity 620 is formed by being enclosed with a first part of a second capsule wall 621-1, a second fragile structure 622, a second part of the second capsule wall 621-2, the first membrane 614, and a second membrane 624. The second capsule wall 621, which includes the first part of the second capsule wall 621-1 and the second part of the second capsule wall 621-2, and the second fragile structure 622 are located outside the twin capsule 60, and integrated with the capsule outer wall corresponding to the first accommodation cavity. The second membrane 624 is located inside the twin capsule 60, and works together with the first membrane 614 to partition the interior space of the twin capsule 60 to form an independent second accommodation cavity 620. The second membrane 624 may be made of the same material as the second capsule wall, or made of a different material. The second fragile structure 622 is arranged on a capsule wall corresponding to the second accommodation cavity 620. When the second fragile structure 622 is ruptured, the filling substance in the second accommodation cavity 620 is released.

The third accommodation cavity 630 is formed by being enclosed with a first part of a third capsule wall 631-1, a third fragile structure 632, a second part of the third capsule wall 631-2, and the second membrane 624. The third capsule wall 631, which includes the first part of the third capsule wall 631-1 and the second part of the third capsule wall 631-2, and the third fragile structure 632 are located outside the twin capsule, and connected to the capsule outer wall corresponding to the second accommodation cavity 620. The second membrane 624 is located inside the twin capsule 60, and partitions the interior space of the twin capsule 60 into a second accommodation cavity 620 and a third accommodation cavity 630. The third fragile structure 632 is arranged on a capsule wall corresponding to the third accommodation cavity 630. When the third fragile structure 632 is ruptured, the filling substance in the third accommodation cavity 630 is released.

In the twin capsule shown in FIG. 6, the first membrane 610 and the second membrane 620 are arranged to partition the interior space of the twin capsule 60 into three independent accommodation cavities. The three independent accommodation cavities correspond to separate fragile structures respectively. The corresponding fragile structure of each accommodation cavity possesses a different packaging strength. For example, in FIG. 6, the packaging strength of the first fragile structure 612 is greater than the packaging strength of the second fragile structure 622, and the packaging strength of the second fragile structure 622 is greater than the packaging strength of the third fragile structure 632. In this way, among the corresponding fragile structures of the accommodation cavities under the action of the gas pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. To be specific, the filling substance in the third accommodation cavity 630 is released first, the filling substance in the second accommodation cavity 620 is released later, and the filling substance in the first accommodation cavity 610 is released last. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule is approximately 10% to 50%. The thickness of the fragile region is generally 10 µm to 300 µm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 µm, and the internal pressure threshold is 0.4 MPa when the thickness is 200 µm). Therefore, each capsule can regulate the pressure relief order by using stepwise thicknesses of the fragile regions. The fragile regions may be arranged in various ways. Another way of forming the fragile regions is to nick a given part of the outer wall of the capsule. The depth of the nick represents the packaging strength of the fragile region. The packaging strength is lower if the depth is great, and the packaging strength is higher if the depth is small.

During formation of the twin capsule 60, first, the first membrane 614 and the second membrane 62 are arranged inside the capsule wall by welding or gluing or other means. The first membrane 614, the second membrane 62, and the outer wall of the capsule form an accommodation cavity. After the filling substance is injected into each accommodation cavity, the accommodation cavity is sealed by laser welding or other means, thereby forming a twin capsule structure.

FIG. 7 is a schematic diagram of a twin capsule 60 after independent accommodation cavities in the twin capsule are filled with filling substances. The first accommodation cavity 610 is filled with a first filling substance 613, the second accommodation cavity 620 is filled with a second filling substance 623, and the third accommodation cavity 630 is filled with a third filling substance 633. The filling substances may be the same or different. When the filling substances are the same, the same substance can be released in an orderly manner under different pressures in the battery cell. When the filling substances are different, different substances can be released in an orderly manner under different pressures in the battery cell to refill the battery cell with various desired substances.

Definitely, in order to increase the flexibility of using the twin capsule, the packaging strengths of the fragile structures may be set at discretion. For example, when the number of independent accommodation cavities in the twin capsule is relatively large, for example, is 5 to 9, the fragile structures corresponding to two or three accommodation cavities may be set to possess the same packaging strength, so as to increase the dosage of a substance released at a time. Alternatively, the difference in the packaging strength between the fragile structures may be reduced, so as to reduce intervals at which different accommodation cavities release the filling substance, and to refill the cell core with the desired substance stepwise at dense intervals. Moreover, the capacity may be identical or different between the accommodation cavities. The capacity of each accommodation cavity may be set at discretion according to the use characteristics of the cell core. The substance consumed by the cell core in a large amount may be stored in a large-capacity accommodation cavity, and the substance consumed in a small amount may be stored in a small-capacity accommodation cavity. Definitely, other arrangement manners are applicable, without being limited in this embodiment of this application. By adjusting the capacity of the accommodation cavity and the packaging strength of the fragile structure at discretion, the battery cell can be refilled with desired substances more efficiently.

As can be seen from the foregoing embodiment, in the twin capsule structure, the membrane partitions the interior space of the capsule into a plurality of independent accommodation cavities. Each accommodation cavity includes a corresponding fragile structure, and each fragile structure possesses a different packaging strength. In this way, this embodiment implements the function of storing different types of filling substances by using a single capsule. The different filling substances stored in the accommodation cavities in the capsule can be released stepwise in response to different external pressures, thereby improving pertinency of refilling the cell core with the desired substances.

Figure 8:
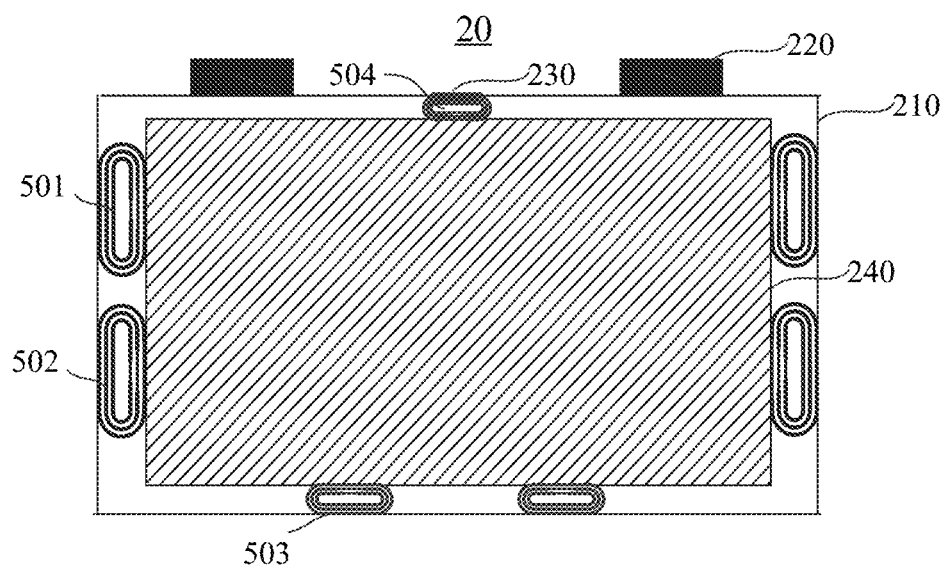
FIG. 8 is a schematic structural diagram of a battery cell according to an embodiment of this application.
Figure 9:
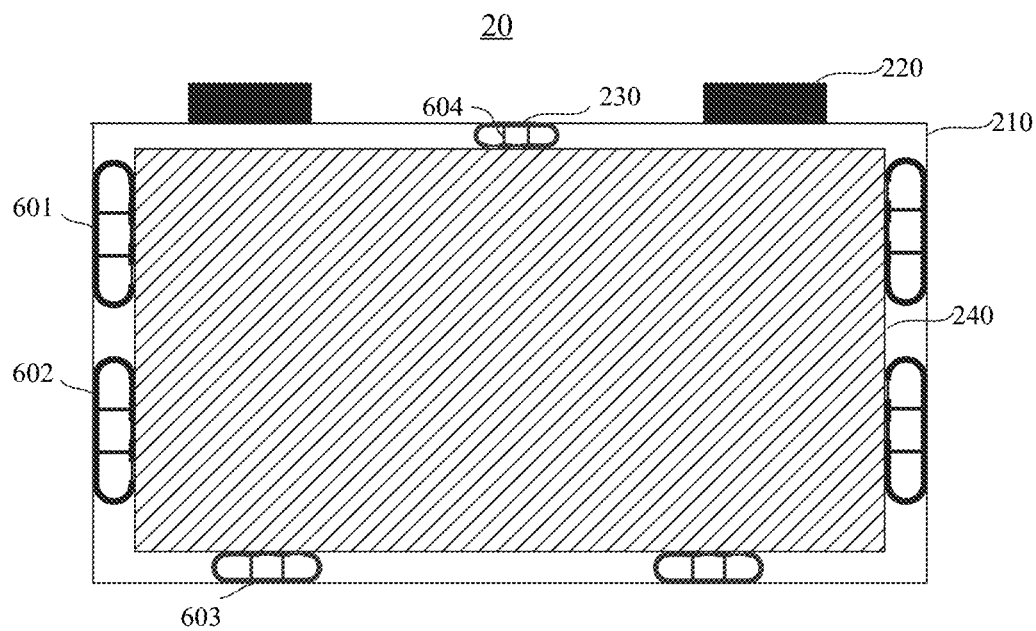
FIG. 9 is a schematic structural diagram of another battery cell according to an embodiment of this application.
Figure 10:
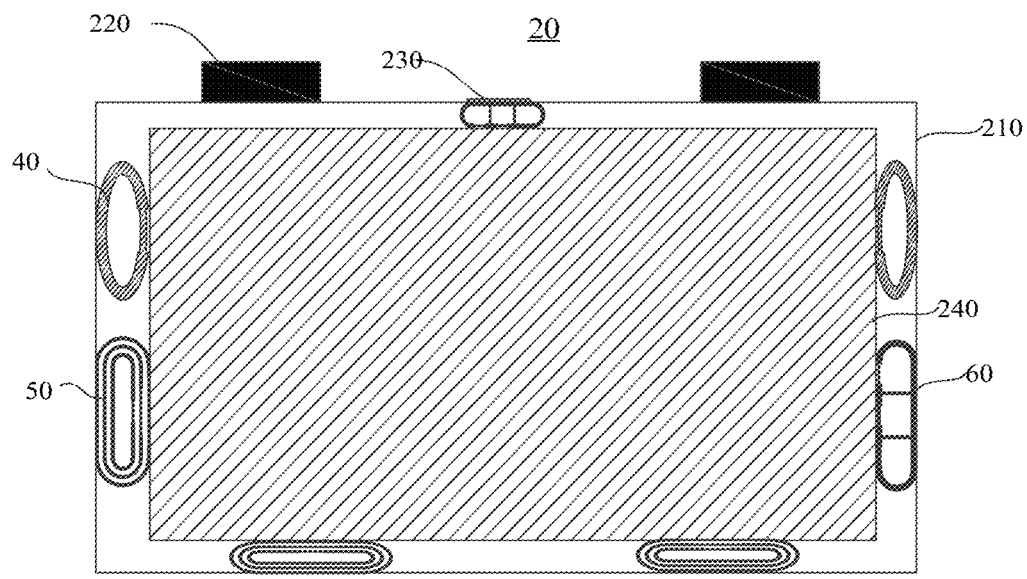
FIG. 10 is a schematic structural diagram of a battery cell equipped with mixed types of capsules according to an embodiment of this application.

An embodiment of this application further provides a battery cell. As shown in FIG. 8 to FIG. 10, the battery cell includes a housing 210, a cell core 240, and the parent-child capsule 50 and/or the twin capsule 60 disclosed in the foregoing embodiments. The cell core 240 is accommodated in the housing 210. The parent-child capsule 50 and/or the twin capsule 60 is accommodated in the housing, and arranged corresponding to a sidewall of the cell core 240.

As shown in FIG. 8, the battery cell 20 includes one or more parent-child capsules 50. The structures of the parent-child capsules 50 are illustrated in FIG. 4 and FIG. 5, description of which is omitted here. In FIG. 8, the parent-child capsule is arranged corresponding to a sidewall of the cell core 240. The sidewall of the cell core includes a sidewall of the cell core in a height direction, a sidewall in a width direction, a sidewall of the cell core in a thickness direction, and the like. As shown in FIG. 8, the first parent-child capsule 501 and the second parent-child capsule 502 are arranged between a sidewall of the cell core in the height direction and the housing. The parent-child capsule may be arranged on the housing by gluing or laser welding or other means, or arranged on the cell core. Alternatively, the parent-child capsule may be placed in all gaps between the sidewall and the housing, so as to fill all spaces. The third parent-child capsule 503 is arranged corresponding to a sidewall of the cell core in the height direction, and located at the bottom of the housing of the battery cell. The fourth parent-child capsule 504 is arranged corresponding to a sidewall at the other end of the cell core in the height direction, and located on the top of the cell core. When the parent-child capsule is arranged on the top of the cell core in the height direction, the substance released by the capsule permeates into an electrode core of the cell core more easily due to gravity, thereby improving the effect of electrolyte refilling.

As shown in FIG. 9, the battery cell 20 includes one or more twin capsules 60. The structures of the twin capsules 60 are illustrated in FIG. 6 and FIG. 7, description of which is omitted here. In FIG. 9, the twin capsule is arranged corresponding to a sidewall of the cell core 240. The sidewall of the cell core includes a sidewall of the cell core in the height direction, a sidewall in a width direction, a sidewall of the cell core in a thickness direction, and the like. Alternatively, the twin capsule may be arranged in any interspace inside the cell core, including any interspace on two sides of or above the cell core or other spaces, without limiting the number and shape of the capsules.

As shown in FIG. 9, the first twin capsule 601 and the second twin capsule 602 are arranged between a sidewall of the cell core in the height direction and the housing. The twin capsule may be arranged on the housing by gluing or laser welding or other means, or arranged on the cell core. Alternatively, the twin capsule may be placed in all gaps between the sidewall and the housing, so as to fill all spaces. The third twin capsule 603 is arranged corresponding to a sidewall of the cell core in the height direction, and located at the bottom of the housing of the battery cell. The fourth twin capsule 604 is arranged corresponding to a sidewall on the top of the cell core in the height direction. When the twin capsule is arranged on the top of the cell core in the height direction, the substance released by the capsule permeates into an electrode core of the cell core more easily due to gravity, thereby improving the effect of electrolyte refilling.

In this embodiment of this application, further, as shown in FIG. 10, the parent-child capsule 50, the twin capsule 60, and the discrete capsule 40 may be arranged compositely in the battery cell. As shown in FIG. 10, a discrete capsule 40 and a parent-child capsule 50 are arranged between a sidewall at one end of the cell core in the height direction and the housing 210, and a discrete capsule 40 and a twin capsule 60 are arranged between a sidewall at the other end of the cell core in the height direction and the housing 210. The discrete capsule 40 is a capsule structure with a single separate accommodation cavity. With only one accommodation cavity, a discrete capsule can store a larger amount of a substance than a twin capsule 60 or parent-child capsule 50 of the same size. Therefore, arranging the discrete capsule 40, the twin capsule 60, and the parent-child capsule 50 compositely can meet a requirement of supplementing a substance in large amounts. For example, during the use of the cell core, the electrolytic solution is most consumed over time. Therefore, the electrolytic solution may be stored in the discrete capsule 40, and other substances may be stored in the twin capsule 60 and the parent-child capsule 50. Such a combination diversifies the ways of refilling the cell core with substances. As shown in FIG. 10, with respect to the location of the capsule, the capsule may also be arranged on a sidewall of the cell core. The sidewall includes a sidewall of the cell core in a height direction, a sidewall in a width direction, a sidewall of the cell core in a thickness direction, and the like.

By arranging the capsule structure with a plurality of accommodation cavities in the battery cell, this embodiment implements the function of storing different types of filling substances by using a single capsule. The different filling substances stored in the accommodation cavities in the capsule can be released stepwise in response to different external pressures, thereby improving pertinency of refilling the cell core with the desired substances. Moreover, with the twin capsule and the parent-child capsule arranged compositely inside the battery cell, the cell core can be refilled with substances precisely and meticulously.

In some embodiments, as shown in FIG. 8 and FIG. 9, in order to improve the effect of infiltration, the fragile structure of the capsule is arranged corresponding to the sidewall of the cell core. That is, the fragile structure fits closely with the outer wall of the cell core. No matter whether the structure is a discrete capsule, a parent-child capsule, or a twin capsule, the filling substance stored in the accommodation cavity in the capsule overflows from the fragile structure. With the fragile structure arranged corresponding to the sidewall of the cell core, the filling substance can contact the sidewall of the cell core first, thereby improving the effect of infiltration. For the capsule arranged at one end of the cell core in the height direction, the fragile structure closely fits with a tab part of the cell core downward. When the fragile structure is ruptured, the overflowing filling substance infiltrates the interior of the cell core more easily due to gravity.

Figure 11:
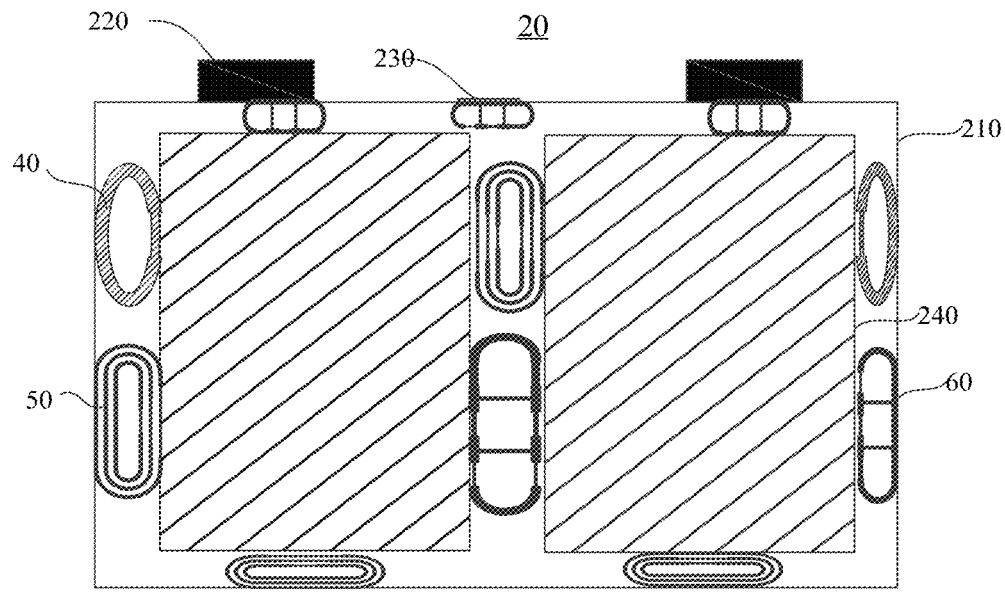
FIG. 11 is a schematic structural diagram of a battery cell with a plurality of cell cores according to an embodiment of this application.

In some embodiments, as shown in FIG. 11, the battery cell includes a plurality of cell cores. The capsule is arranged between each cell core and a sidewall of the housing, and/or the capsule is arranged between adjacent cell cores.

As shown in FIG. 11, the battery cell 20 includes a plurality of cell cores. The discrete capsule, the twin capsule, and the parent-child capsule are arranged compositely between the sidewall of the cell core and the housing. At the same time, a capsule structure is also arranged between different cell cores. To improve the effect of infiltration, a capsule structure is arranged between different cell cores. When the gas pressure in the battery cell is excessive, or the cell core expands during use, in a case that the expansion force is greater than a pressure threshold tolerable by the fragile structure of the capsule, the capsule arranged between the cell cores is ruptured, and the overflowing substance directly contacts the cell core, so that the cell core can absorb the desired substance more efficiently.

Figure 12:
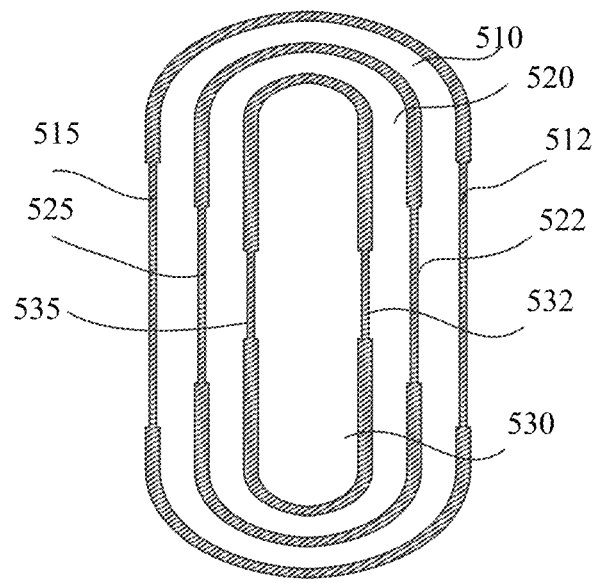
FIG. 12 is a schematic structural diagram of a parent-child capsule with a plurality of fragile structures according to an embodiment of this application.
Figure 13:
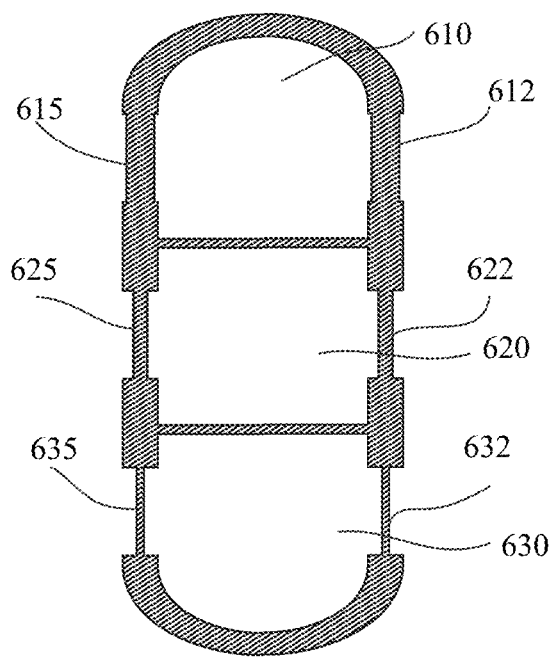
FIG. 13 is a schematic structural diagram of a twin capsule with a plurality of fragile structures according to an embodiment of this application.

For the capsule structure arranged between cell cores, in order to improve the effect of infiltration, the capsule includes a plurality of fragile structures. The plurality of fragile structures are arranged corresponding to the sidewalls of the cell core respectively, as shown in FIG. 12 and FIG. 13. FIG. 12 shows a parent-child capsule structure. The parent-child capsule includes a plurality of independent accommodation cavities. At least two fragile structures are arranged on a capsule wall corresponding to each of the accommodation cavities. In FIG. 12, the capsule wall corresponding to the accommodation cavity 510 includes two first fragile structures 512 and 515, located on two sides of the capsule respectively. The two fragile structures are arranged corresponding to the sidewalls of the cell core on two sides respectively. Similarly, the sub-capsule corresponding to the accommodation cavity 520 also includes two second fragile structures 522 and 525. After a second fragile structure is ruptured, when the pressure in the battery cell reaches a pressure threshold of the first fragile structure, the fragile structures on two sides of the sub-capsule are ruptured simultaneously, and the filling substance overflows from both sides. Both sides of the cell core can contact the overflowing filling substance, thereby improving the effect of infiltration. Similarly, the sub-capsule corresponding to the accommodation cavity 530 also includes two third fragile structures 532 and 535. When the pressure in the battery cell reaches a threshold, the third fragile structures are cracked at the same time, thereby improving the effect of infiltration.

FIG. 13 shows a twin capsule structure. The twin capsule includes a plurality of independent accommodation cavities. At least two fragile structures are arranged on a capsule wall corresponding to each of the accommodation cavities. In FIG. 13, the accommodation cavity 610 includes two first fragile structures 612 and 615, located on two sides of the capsule respectively. The two fragile structures are arranged corresponding to the sidewalls of the cell core on two sides respectively. Similarly, the capsule corresponding to the accommodation cavity 620 also includes two second fragile structures 622 and 625. After a second fragile structure is ruptured, when the pressure in the battery cell reaches a pressure threshold of the first fragile structure, the fragile structures on two sides of the capsule are ruptured simultaneously, and the filling substance overflows from both sides. Both sides of the cell core can contact the overflowing filling substance, thereby improving the effect of infiltration. Similarly, the capsule corresponding to the accommodation cavity 630 also includes two third fragile structures 632 and 635.

By arranging a plurality of fragile structures on the capsule wall corresponding to the accommodation cavity, and by arranging a plurality of fragile structures corresponding to the sidewalls of the cell core respectively, the capsule can release the filling substance from the plurality of fragile structures simultaneously. A plurality of parts of the cell core can contact the filling substance simultaneously, thereby improving the effect of infiltration for the cell core, and making the cell core absorb the desired filling substance more efficiently.

In some embodiments, an explosion-proof valve is arranged on the housing 210 of the battery cell 20, and the capsule is arranged opposite to the explosion-proof valve 230. As shown in FIG. 8 to FIG. 11, an explosion-proof valve 230 is arranged between electrodes 220 on the housing of the battery cell. The explosion-proof valve 230 is a pressure relief hole designed to prevent an excessive gas pressure inside the battery cell. When the gas pressure in the battery cell is higher than a given threshold, the gas in the battery cell is released through the explosion-proof valve, thereby relieving the gas pressure in the battery cell. By arranging the capsule opposite to the explosion-proof valve, the filling substance stored in the capsule can be released more efficiently.

In some embodiments, each fragile structure of the capsule possesses a different packaging thickness. To release the filling substances from different accommodation cavities stepwise, this application assigns a different packaging strength to the fragile structure corresponding to each different accommodation cavity. In this way, among the corresponding fragile structures of the accommodation cavities under the action of the internal pressure of the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 μm, and the internal pressure threshold is 0.4 MPa when the thickness is 200 μm). Therefore, each capsule can regulate the pressure relief order by using stepwise thicknesses of the fragile regions. The fragile regions may be arranged in various ways. Another way of forming the fragile regions is to nick a given part of the outer wall of the capsule. The depth of the nick represents the packaging strength of the fragile region. The packaging strength is lower if the depth is great, and the packaging strength is higher if the depth is small.

In some embodiments, the packaging strengths of the fragile structures change stepwise. In order to adapt to the pressure in the battery cell and release the filling substances in the accommodation cavities in the capsule stepwise in batches, in view of the characteristics of the internal pressure of the cell core and the substances required by the cell core in different pressure stages, this application arranges the packaging strengths of the corresponding fragile structures of the accommodation cavities to change stepwise, so as to gradually release the substances required by the cell core.

In some embodiments, each accommodation cavity stores a different substance. As described in the foregoing embodiments, the accommodation cavities may store different substances according to the substances required by the cell core at different stages, for example, may store lithium supplementing agent, flame retardant, electrolytic solution, component/gas absorbent, metal capturing agent, and the like. The release of stored substances achieves the purposes of improving longevity and safety of the cell core.

Definitely, the accommodation cavities of the capsule may store the same substance, such as electrolytic solution. The electrolytic solution is sufficient in an early stage of the lifecycle of the battery. When the aging of the battery aggravates and the electrolytic solution keeps being consumed over time, side reaction products gradually accumulate and the internal gas pressure keeps rising. The corresponding fragile regions are ruptured stepwise in ascending order of thickness of the fragile regions when the internal pressure keeps increasing (that is, when the aging keeps aggravating). The regions release the electrolytic solution in sequence, thereby overcoming a cycle capacity plunge caused by lithium plating arising from insufficient electrolyte circulation.

In some embodiments of this application, the accommodation cavities store a flame retardant, a gas absorbent, a lithium supplementing agent, and an electrolytic solution respectively in descending order of the packaging strength of the fragile structure. Problems such as lack of electrolytic solution and lithium ions usually occur over time when the cell core is in use. At a later stage, the problems such as increased amount of gas generated in the battery and increased fire hazards are more prone to occur. In this embodiment of this application, the foregoing hazards are resolved in a pertinent manner. The cell core is refilled with the electrolytic solution, lithium supplementing agent, gas absorbent, and flame retardant separately.

In a case that the electrolytic solution is severely consumed at the middle and later stages of the lifecycle, the electrolytic solution is supplemented in time to enhance the effect of infiltration for electrode plates, avoid central lithium plating caused by insufficient electrolyte circulation, and improve an end-of-line test (EOL) capacity retention rate and longevity, power performance, fast charge capability, and the like. Therefore, the electrolytic solution and lithium ions need to be supplemented in large amounts. In addition, the amount of gas generated in the cell core in use increases significantly over time. In this case, the capsules can release a gas hardener/absorbent (such as CaO) to harden and absorb the gas ($CO_2$) in the cell core, thereby achieving the effects of EOL degassing and internal pressure relief, and reducing the risk of the explosion-proof valve bursting open. At the later stage of the lifetime of the cell core, when lithium dendrites pierce a separator or thermal runaway ultimately occurs in an abuse test due to defects of the cell core at the end of life, the pressure surges up instantaneously and reaches a packaging strength threshold of the fragile structure that possesses the maximum packaging strength. In this case, the flame retardant needs to be released to implement rapid cooling, control the severity of thermal runaway, and improve safety performance.

Figure 14:
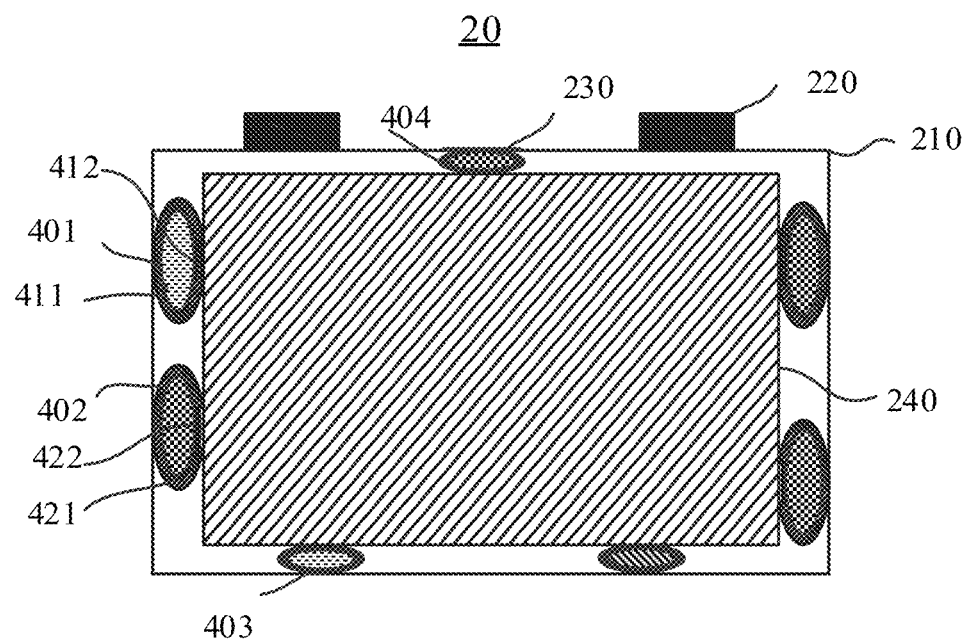
FIG. 14 is a schematic structural diagram of a battery cell equipped with a plurality of discrete capsules according to an embodiment of this application.

In some embodiments, another battery cell 20 is provided. As shown in FIG. 14, the battery cell includes a housing 210, a cell core 240, and a plurality of capsules. The cell core is accommodated in the housing. The plurality of capsules are accommodated in the housing, and arranged corresponding to sidewalls of the cell core respectively. A fragile structure is arranged on a surface of each of the capsules, and the fragile structure of each capsule possesses a different packaging strength.

Figure 15:
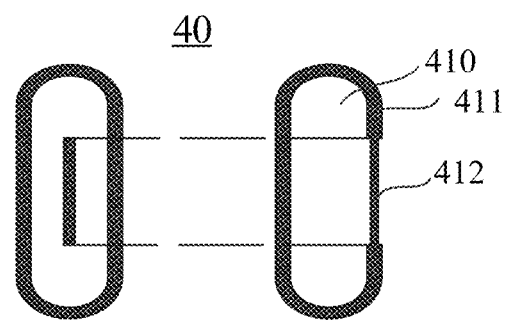
FIG. 15 is a schematic structural diagram of a discrete capsule according to an embodiment of this application.
Figure 16:
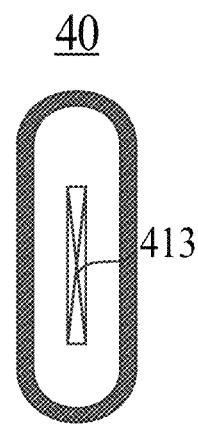
FIG. 16 is a schematic diagram of a fragile structure of a discrete capsule according to an embodiment of this application.

As shown in FIG. 15, the capsule is a discrete capsule 40. The discrete capsule 40 includes an accommodation cavity 410. The accommodation cavity 410 is formed by being enclosed with a capsule wall 411 and a fragile structure 412. As mentioned in the foregoing embodiment, the packaging strength of the fragile structure 412 may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 μm, and the internal pressure threshold is 0.4 MPa when the thickness is 200 μm). Therefore, each capsule can regulate the pressure relief order by using stepwise thicknesses of the fragile regions. The fragile regions may be arranged in various ways. Another way of forming the fragile regions is to nick a given part of the outer wall of the capsule. As shown in FIG. 16, a fragile region 413 is formed by nicking. The depth of the nick represents the packaging strength of the fragile region. A great depth represents a lower packaging strength, and a small depth represents a higher packaging strength.

A plurality of discrete capsules with different fragile structures are arranged inside the battery cell. As shown in FIG. 14, the discrete capsules include a first discrete capsule 401, a second discrete capsule 402, a third discrete capsule 403, a fourth discrete capsule 404, and the like. A plurality of discrete capsules are accommodated in the housing, and are arranged corresponding to sidewalls of the cell core respectively. The first discrete capsule 401 includes a first capsule wall 411 and a first fragile structure 412. The second discrete capsule 402 includes a second capsule wall 421 and a second fragile structure 422. The first fragile structure and the second fragile structure possess different packaging strengths. Similarly, the third discrete capsule, the fourth discrete capsule, and the like, include fragile structures that possess different packaging strengths. A plurality of discrete capsules with fragile structures of different packaging strengths are arranged in the battery cell, so that different discrete capsules can release different filling substances stepwise in sequence under different pressures.

In some embodiments, in order to improve the effect of infiltration, the fragile structure of the capsule is arranged corresponding to the sidewall of the cell core. That is, the fragile structure fits closely with the outer wall of the cell core. No matter whether the structure is a discrete capsule, a parent-child capsule, or a twin capsule, the filling substance stored in the accommodation cavity in the capsule overflows from the fragile structure. With the fragile structure arranged corresponding to the sidewall of the cell core, the filling substance can contact the sidewall of the cell core first, thereby improving the effect of infiltration. For the capsule arranged at one end of the cell core in the height direction, the fragile structure closely fits with a tab part of the cell core downward. When the fragile structure is ruptured, the overflowing filling substance infiltrates the interior of the cell core more easily.

In some embodiments, the battery cell includes a plurality of cell cores. The capsule is arranged between each cell core and a sidewall of the housing, and/or the capsule is arranged between adjacent cell cores.

As shown in FIG. 11, the battery cell 20 includes a plurality of cell cores. Between the cell cores, the twin capsule and the parent-child capsule in FIG. 11 may be replaced with discrete capsules, details of which are omitted here. To improve the effect of infiltration, a capsule structure is arranged between different cell cores. When the gas pressure in the battery cell is excessive, or the cell core expands during use, in a case that the expansion force is greater than a pressure threshold tolerable by the fragile structure of the capsule, the capsule arranged between the cell cores is ruptured, and the overflowing substance directly contacts the cell core, so that the cell core can absorb the desired substance more efficiently.

Figure 17:
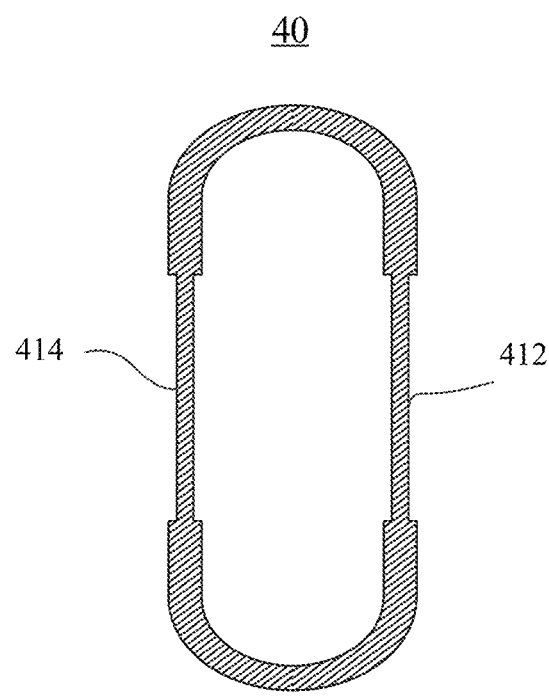
FIG. 17 is a schematic structural diagram of a discrete capsule with a plurality of fragile structures according to an embodiment of this application.

For the discrete capsule structure arranged between cell cores, in order to improve the effect of infiltration, a plurality of fragile structures are arranged on the wall of the discrete capsule. The plurality of fragile structures are arranged corresponding to the sidewalls of the cell core respectively, as shown in FIG. 17. FIG. 17 shows a discrete capsule structure. The discrete capsule includes first fragile structures 412 and 414. When the pressure in the battery cell reaches a pressure threshold of the first fragile structure, the fragile structures on two sides of the discrete capsule are ruptured simultaneously, and the filling substance overflows from both sides. Both sides of the cell core can contact the overflowing filling substance, thereby improving the effect of infiltration.

In some embodiments, each fragile structure of the capsule possesses a different packaging thickness. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule is approximately 10% to 50%. The thickness of the fragile region is generally 10 μm to 300 μm. The pressure borne by the fragile region is less than that borne by other non-thinned regions. The thickness may differ between the fragile regions depending on the required packaging strength.

In some embodiments, the packaging strengths of the fragile structures change stepwise. In order to adapt to the gas pressure in the battery cell and release the filling substances in the capsules stepwise in batches, in view of the characteristics of the internal pressure of the cell core and the substances required by the cell core in different pressure stages, this application sets the packaging strengths of the fragile structures corresponding to the capsules in such a way that the packaging strengths change stepwise to gradually release the substances required by the cell core.

According to some embodiments of this application, a battery is further disclosed. The battery includes any one of the battery cells mentioned in the foregoing embodiments. The battery cell may include one or more parent-child capsules, or one or more twin capsules, or a plurality of discrete capsules, or may include a combination of parent-child capsules, twin capsules, and discrete capsules. Each capsule may store one or more substances required by the cell core. Therefore, the same substance or different substances in the cell core can be released gradually in view of a pressure inside the cell core that is in use or in different aging states. For the cell core at different stages, different dosages of electrolytic solution or different types of desired substances are provided, thereby improving pertinency of refilling the cell core with substances.

According to some embodiments of this application, an electrical device is further provided. The electrical device includes the battery disclosed in the foregoing embodiment, and the battery is configured to provide electrical energy for the electrical device. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A capsule, comprising:
   two membranes arranged in the capsule and configured to partition an interior of the capsule into a plurality of independent accommodation cavities, the plurality of independent accommodation cavities comprising a first accommodation cavity, a second accommodation cavity, and a third accommodation cavity; and
   a plurality of fragile structures comprising a first fragile structure, a second fragile structure, and a third fragile structure, a packaging strength of the first fragile structure being greater than a packaging strength of the second fragile structure, the packaging strength of the second fragile structure being greater than a packaging strength of the third fragile structure, each of the plurality of independent accommodation cavities corresponding to one of the plurality of fragile structures; wherein;
      along a length direction of the capsule, a first part of a first capsule wall, the first fragile structure, a second part of the first capsule wall, a first part of a second capsule wall, the second fragile structure, a second part of the second capsule wall, a first part of a third capsule wall, the third fragile structure, and a second part of the third capsule wall are disposed on a side of the capsule in sequence;
      a thickness of the first capsule wall, a thickness of the second capsule wall, and a thickness of the third capsule wall are greater than a thickness of the first fragile structure and greater than a thickness of each of the two membranes;
      the thickness of the first fragile structure is greater than a thickness of the second fragile structure, the thickness of the second fragile structure is greater than a thickness of the third fragile structure; and
      the first fragile structure, the second fragile structure, and the third fragile structure correspond to the first accommodation cavity, the second accommodation cavity, and the third accommodation cavity, respectively.

2. A battery cell, comprising:
   a housing;
   a cell core, accommodated in the housing; and
   the capsule according to claim 1, accommodated in the housing and arranged corresponding to a sidewall of the cell core.

3. The battery cell according to claim 2, wherein each of the plurality of fragile structures is arranged corresponding to the sidewall of the cell core.

4. The battery cell according to claim 2, comprising:
   a plurality of cell cores;
   wherein the capsule is arranged between one of the cell cores and a sidewall of the housing, and/or the capsule is arranged between adjacent ones of the cell cores.

5. The battery cell according to claim 4, wherein:
   the plurality of fragile structures further comprises a fourth fragile structure;
   the first fragile structure, the second fragile structure, and the third fragile structure are arranged corresponding to a sidewall of one of the plurality of cell cores; and
   the fourth fragile structure is arranged corresponding to a sidewall of another one of the plurality of cell cores adjacent to the one of the plurality of cell cores.

6. The battery cell according to claim 2, wherein an explosion-proof valve is arranged on the housing, and the capsule is arranged opposite to the explosion-proof valve.

7. The battery cell according to claim 2, wherein different ones of the plurality of independent accommodation cavities store different substances.

8. The battery cell according to claim 7, wherein:
   the plurality of independent accommodation cavities further comprises a fourth accommodation cavity;
   the plurality of fragile structures further comprises a fourth fragile structure corresponding to the fourth accommodation cavity; and
   the plurality of independent accommodation cavities store a flame retardant, a gas absorbent, a lithium supplementing agent, and an electrolytic solution, respectively, in descending order of the packaging strengths of the plurality of fragile structures.

9. A battery cell, comprising:
   a housing;
   a cell core, accommodated in the housing; and
   a plurality of capsules, accommodated in the housing and each arranged corresponding to a sidewall of the cell core, and each of the plurality of capsules being the capsule according to claim 1.

10. The battery cell according to claim 9, wherein each of the plurality of fragile structures of each of the plurality of capsules is arranged corresponding to the sidewall of the cell core.

11. The battery cell according to claim 9, comprising:
   a plurality of cell cores;
   wherein the each of the plurality of capsules is arranged between one of the cell cores and a sidewall of the housing, and/or the each of the plurality of capsules is arranged between adjacent ones of the cell cores.

12. A battery, comprising the battery cell according to claim 9 accommodated in a box.

13. An electrical device, comprising the battery according to claim 12, the battery being configured to provide electrical energy.

* * * * *